United States Patent
Nagaraja et al.

(10) Patent No.: US 11,734,433 B2
(45) Date of Patent: Aug. 22, 2023

(54) OPEN SOURCE VULNERABILITY REMEDIATION TOOL

(71) Applicant: VISA INTERNATIONAL SERVICE ASSOCIATION, San Francisco, CA (US)

(72) Inventors: Vinjith Nagaraja, Austin, TX (US); Raymond Brammer, Round Rock, TX (US); James Myers, Round Rock, TX (US); Christopher Gutierrez, Foster City, CA (US); Ireneusz Pazdzierniak, Foster City, CA (US); Shanshan Jiang, Foster City, CA (US); Karim Mawani, Foster City, CA (US); Pankaj Rathore, Austin, TX (US); Jerry Wald, San Francisco, CA (US); David Worth, Foster City, CA (US); Dhruv Vig, Austin, TX (US); Archana Taparia, Foster City, CA (US); Robert Chifamba, Austin, TX (US); Vamshi Ramarapu, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/709,241

(22) Filed: Mar. 30, 2022

(65) Prior Publication Data
US 2022/0222353 A1    Jul. 14, 2022

Related U.S. Application Data

(63) Continuation of application No. 16/228,538, filed on Dec. 20, 2018, now Pat. No. 11,308,218.

(51) Int. Cl.
*G06F 21/57* (2013.01)
*G06F 11/36* (2006.01)
*G06F 8/71* (2018.01)

(52) U.S. Cl.
CPC .............. *G06F 21/577* (2013.01); *G06F 8/71* (2013.01); *G06F 11/3664* (2013.01); *G06F 11/3684* (2013.01); *G06F 2221/033* (2013.01)

(58) Field of Classification Search
CPC ..... G06F 2221/033; G06F 21/577; G06F 8/71
See application file for complete search history.

(56) References Cited

U.S. PATENT DOCUMENTS 10,229,251 B1 * 3/2019 Dalessio ................... G06F 8/71
10,579,803 B1 * 3/2020 Mueller ................ G06F 21/577
(Continued)

OTHER PUBLICATIONS

Xian Zhan et al.; ATVHunt er: Reliable Version Detection of Third-Party Libraries for Vulnerability Identification in Android Applications; IEEE; pp. 1695-1707 (Year: 2021).*
(Continued)

*Primary Examiner* — S. Sough
*Assistant Examiner* — Cuong V Luu
(74) *Attorney, Agent, or Firm* — Kilpatrick Townsend & Stockton LLP

(57) ABSTRACT

A method and system for remediating vulnerable code libraries, including open source libraries, in a software application. An application, that uses code libraries, and information regarding known library vulnerabilities are received, then it is determined if one or more libraries in the application are vulnerable based upon the information. For each of the one or more vulnerable libraries, a library version that minimizes risk is determined. The determined library version is incorporated into the application to form a test application, and an application test is performed on the test application. If an application test score on the test application is below a predetermined threshold, the determined library version is incorporated into a final application precursor. A final application can be determined from the
(Continued)

final application precursor for each of the one or more vulnerable libraries.

20 Claims, 7 Drawing Sheets

(56) References Cited

U.S. PATENT DOCUMENTS

| | | |
|---|---|---|
| 2017/0041338 A1 | 2/2017 | Martini et al. |
| 2017/0372072 A1* | 12/2017 | Baset .................. G06F 11/3604 |
| 2018/0025160 A1 | 1/2018 | Hwang et al. |
| 2018/0107580 A1 | 4/2018 | Zhang et al. |
| 2018/0165182 A1 | 6/2018 | Yoshida et al. |
| 2018/0239603 A1 | 8/2018 | Balestrazzi et al. |
| 2019/0079734 A1* | 3/2019 | Kadam ..................... G06F 8/30 |

OTHER PUBLICATIONS

U.S. Appl. No. 16/228,538, Non-Final Office Action, dated Aug. 9, 2021, 29 pages.

U.S. Appl. No. 16/228,538, Notice of Allowance, dated Dec. 22, 2021, 15 pages.

Plate et al., "Impact Assessment for Vulnerabilities in Open-Source Software Libraries", IEEE, Apr. 10, 2015, pp. 411-420.

Zhan et al., "ATVHunter Reliable Version Detection of Third-Party Libraries for Vulnerability Identification in Android Applications", IEEE, Nov. 8, 2021, pp. 1695-1707.

* cited by examiner

OPEN SOURCE VULNERABILITY REMEDIATION TOOL

CROSS REFERENCE TO RELATED APPLICATIONS

This application is a continuation application which claims the benefit of the filing date of U.S. patent application Ser. No. 16/228,538 filed Dec. 20, 2018, which is herein incorporated by reference in its entirety for all purposes.

BACKGROUND

Software libraries can provide software developers with a convenient way to add new functionality to programs. By calling to or importing a library, functionality ranging from astrophysical functions to cryptogram generation can be quickly added to an application.

Open source libraries provide additional benefits. They are often made freely available, in contrast to proprietary software libraries purchased and licensed through a vendor. Because the code for open source libraries is openly accessible, more people are able to examine it for potential improvements and vulnerabilities, which may make open source libraries more robust than proprietary libraries.

All libraries, however, are subject to risks and vulnerabilities. Poor security practices make a library, and thus software that makes use of the library, vulnerable to attack from malicious entities. Libraries, both open source and proprietary, also typically come with licenses that regulate how they may be used. The license may have undesirable terms or conflict with the license of other libraries also in use within the same application.

Open source libraries can pose additional challenges. Because many can be freely downloaded and used, there is no record of who is using them. Therefore, if a vulnerability is discovered, there is no way to notify all affected users. It is up to the developers to routinely check if vulnerabilities have been detected in the libraries that they use. For large codebases containing millions of lines of code, this can quickly become a significant endeavor. Having many eyes on a library may also falsely inflate the sense that the library is secure. A company developing a library may have a dedicated team to check for security risks. An organization developing an open source library may not have the resources to perform thorough checks and thus may rely on the public to check it, with no guarantee on the efficacy.

Once a vulnerability has been discovered in a library, the remediation process can be difficult and time consuming. First, a developer checks if and where the library is in use. Developers then research alternative libraries and library versions to determine a suitable alternative. Then the codebase is updated to incorporate the alternative library version. The resulting application can then be manually tested by developers. For an organization with a large codebase, this process can take months, providing a long window for potential attackers to exploit the vulnerability.

Thus, improved ways of locating and remediating library risks within an application are needed. Embodiments of the invention address these and other problems individually and collectively.

SUMMARY

Embodiments include a method comprising receiving, by a remediation computer, a candidate application that uses a plurality of code libraries; receiving, by the remediation computer, information regarding known library vulnerabilities; and determining, by the remediation computer, if one or more libraries in the plurality of libraries is vulnerable based upon the information. Then, for each of the one or more vulnerable libraries, the method includes: determining, a library version that minimizes risk; incorporating the determined library version into the candidate application to form a test application; performing an application test on the test application; and if the application test is below a predetermined threshold, then incorporating the determined library version into a final application precursor. Then, the method includes determining, by the remediation computer a final application.

Other embodiments include a remediation computer comprising: a processor; and a computer readable medium comprising code, executable by the processor, for implementing a method comprising: receiving a candidate application that uses a plurality of code libraries; receiving information regarding known library vulnerabilities; and determining if one or more libraries in the plurality of libraries is vulnerable based upon the information. Then, for each of the one or more vulnerable libraries, the method includes: determining, a library version that minimizes risk; incorporating the determined library version into the candidate application to form a test application; performing an application test on the test application; and if the application test is below a predetermined threshold, then incorporating the determined library version into a final application precursor. Then, the method includes determining, a final application.

These and other embodiments of the invention are describe below in the Detailed Description with reference to the Drawings.

DETAILED DESCRIPTION

Figure 1:
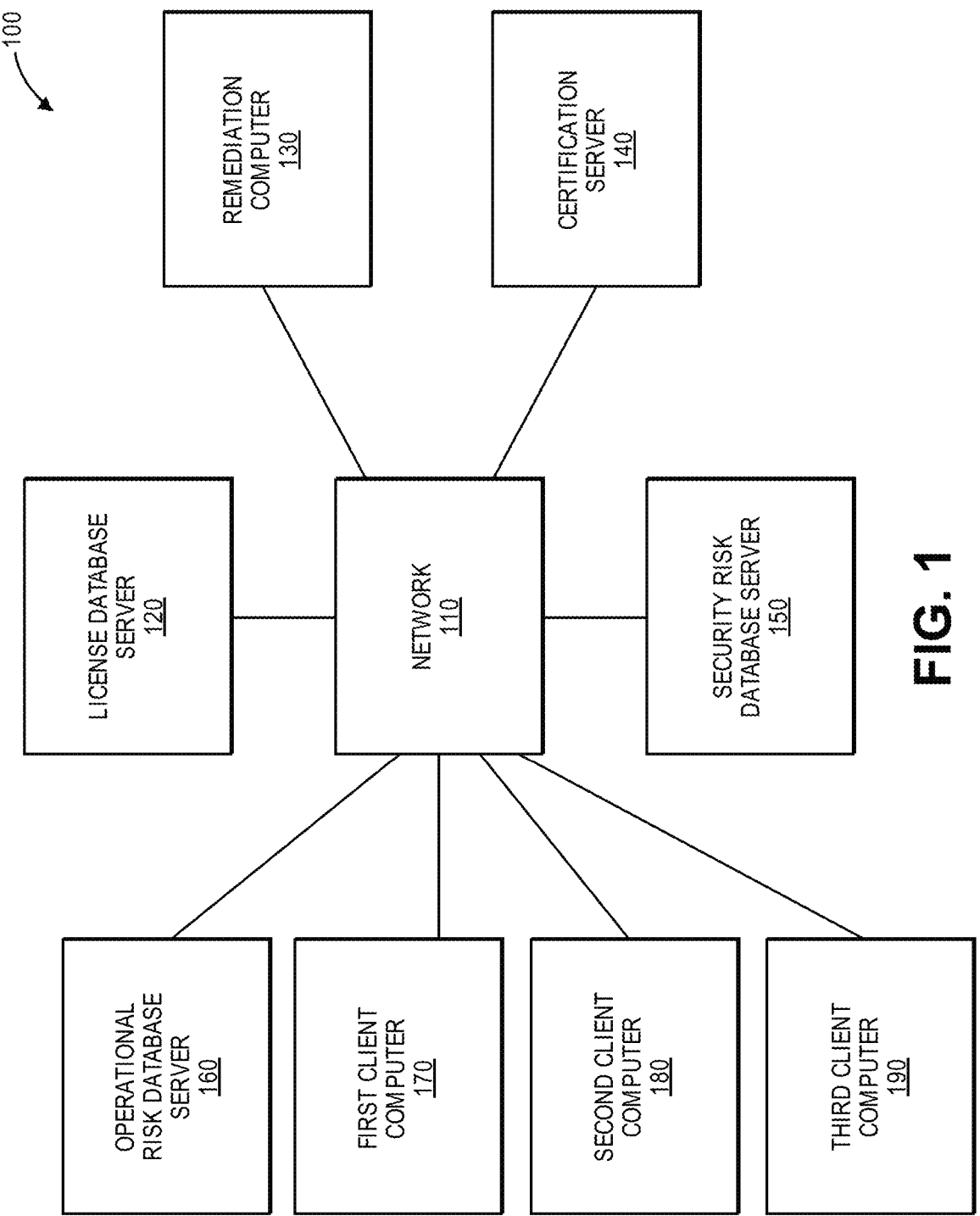
FIG. 1 shows a block diagram of a system according to embodiments.

Prior to discussing embodiments of the invention, some terms can be described in further detail.

An "application" can be a computer program that is used for a specific purpose. Examples of applications may include mobile banking applications, social media applications, and secure access applications. Applications may be used on devices such as smartphones, tablet computers, laptop computers, smartwatches, Internet of Things (IoT) devices, etc.

A "candidate application" can be an application that has not yet been published or deployed. It can be an application that has been finished by a developer but not yet tested. Changes can be made to a candidate application before it is published.

A "library" or "software library" can be a collection of resources used by computer programs. The resources may include configuration data, pre-written code, subroutines, classes, and functions. A library can also be a collection of implementations of behavior. Code in a library can be accessed and reused by a plurality of unrelated programs simultaneously. Libraries allow developers to include desired functionality in an application without needing to develop the functionality.

An "open source library" can be a library that can be used, modified, and or shared publically under defined terms and conditions. Open source libraries may be available free of charge.

A "vulnerable library" can be a library where one or more risks have been identified. The risk may be a security risk. A vulnerable library may also include a license risk, such as a use license that is unfavorable or conflicts with the license of other libraries. Vulnerable libraries may also have operational risk, which may involve a limited or non-existent development or support community.

A "library version" can be a particular published version of a library. New library versions can change the major version, where significant changes have been made since the previous release. Releases can also be of a new minor version, where few changes have been made.

A "test application" can be an application that is being tested. A test application may be built in a test environment, which may closely resemble a production environment. A test application allows the application to be tested before committing changes to a final product.

A "final application precursor" can be an application that has been partially tested or processed but may not be ready for final deployment. For example, it may have some, but not all, vulnerable libraries remediated. A final application precursor may also include recommendations for changes to be made before becoming a final application.

A "final application" can be an application that has been fully tested and is ready for deployment or publication.

An "application test" can be a test that tests the functionalities of an application. Application test can check that an application performs desired functions It can be a functionality test, which tests that an application performs the desired functions. An application test may also be a regression test, performance test, or user interface test.

An "exclusion test" can be a test where a particular element is removed from an application and the functionality of the resulting application is tested. The excluded element may be a library. An error in an exclusion test may indicate that the excluded element is needed in the application. An exclusion test that completes without any errors may indicate that the excluded element can be removed from the final application without losing functionality.

A "user interface test" can be a test of the user interface of an application. Making changes to an application may affect the user interface of the application in an undesired way. The test may be done manually by visually inspecting the user interface of the application. It also may be done computationally.

A "processor" can include any suitable data computation device or devices. A processor may comprise one or more microprocessors working together to accomplish a desired function. The processor may include CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" can be any suitable device or devices that can store electronic data. A suitable memory may comprise a non-transitory computer readable medium that stored instructions that can be executed by a processor to implement a desired method. Examples of memories may comprise one or more memory chips, disk drives, etc. Such memories may operate using any suitable electrical, optical, and/or magnetic mode of operation.

FIG. 1 shows a system 100 comprising a number of components according to an embodiment of the invention. The system 100 comprises a network 110 connected to a plurality of client computers 170, 180, and 190. The network 110 may also be connected to a remediation computer 130 and a certification server 140, in addition to a license database server 120, a security risk database server 150, and an operational risk database server 160. The components of the system 100 may all be in operative communication with each other through a communication network.

The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

The client computers 170, 180, 190 might be computers of developers configured to create applications. The client computers may also store a codebase for applications.

The certification server 140 may be a server for testing an application. It may support a test environment for building a test application. This allows the application to be tested in such a way that simulates the final deployment in a controlled way.

The security risk database server 150 may contain information about known library security risks. The security risk database server 150 may, for example, include information collected by an organization, publically available information, or information generated by a third-party risk analysis program. The risk database may be periodically updated as new risks are identified.

The license database server 120 may contain information about license restrictions. The license database server 120 may also contain information about libraries with conflicting licenses. The information in the license database server 120 may be collected and maintained by an organization.

The operational risk database server 160 may contain information about operational risks. For example, the operational risk database server 160 may contain information about the development community of a library and the frequency with which the library is updated. The operational risk database server 160 may, for example, include information collected by an organization, publically available information, or information generated by a third-party risk analysis program.

Figure 2:
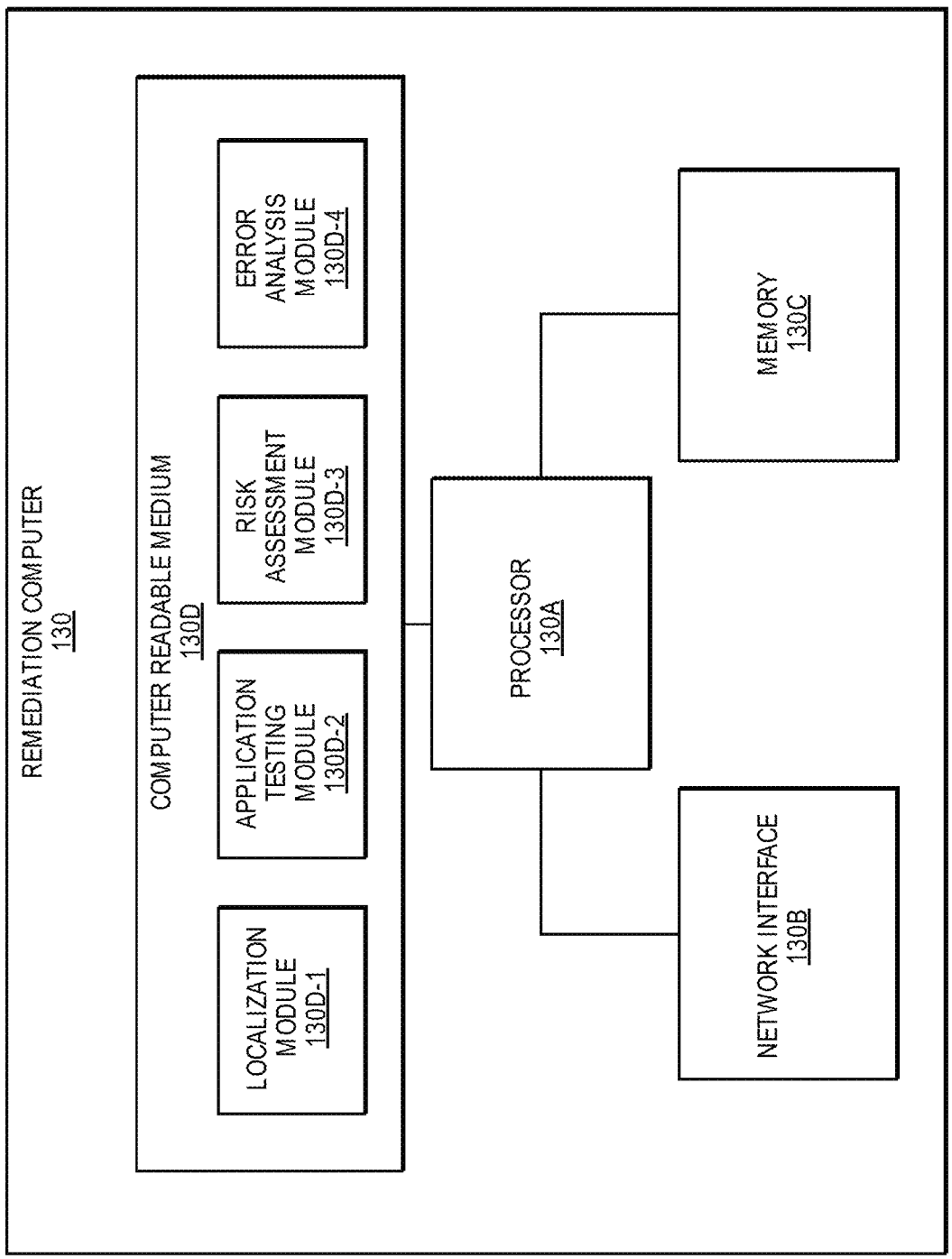
FIG. 2 shows a block diagram of a remediation computer according to embodiments.

One embodiment of the remediation computer 130 is shown in more detail in a block diagram in FIG. 2. The remediation computer 130 may comprise a processor 130A, a network interface 130B, and a memory 130C. The remediation computer 130 may also include a computer readable medium 130D, which may comprise code, executable by the processor for implementing methods according to embodiments. The computer readable medium 130D may contain a localization module 130D-1, an application testing module 130D-2, a risk assessment module 130D-3, and an error analysis module 130D-4.

The localization module 130D-1, in conjunction with the processor 130A, can identify one or more location of a particular library within an application. The localization module 130D-1, in conjunctions with the processor 130A, may do this by searching through the files that comprise the application for calls to the particular library. For example, a command such as "import numpy" may be a call to the Python library NumPy. Therefore, the localization module 130D-1, in conjunction with the processor 130A, may search for the string "numpy" and note the one or more locations (e.g., file names, line numbers) in which it appears.

The application testing module 130D-2, in conjunction with the processor 130A, can test an application. The application testing module 130D-2, in conjunction with the processor 130A, can send testing commands to the certification server 140 for testing of the application. The application testing module 130D-2, in conjunction with the processor 130A, can run the tests as described in FIG. 6 and FIG. 7. The application testing module 130D-2, in conjunction with the processor 130A, may set an error flag to indicate that the application has failed a particular test.

The risk assessment module 130D-3, in conjunction with the processor 130A, can determine if there are known risks in an application. The risk assessment module 130D-3, in conjunction with the processor 130A, can receive information from the license database server and the security risk database server about potential vulnerabilities. The risk assessment module 130D-3, in conjunction with the processor 130A, may then scan the application to determine if the vulnerabilities identified by the license database server and the security risk database server are present in the application. For example, the license database server may identify that library A and library B have conflicting licenses. Then, the risk assessment module 130D-3, in conjunction with the processor 130A, may determine if both libraries A and B are used in the application. As another example, the security risk database server may identify that library C is vulnerable to a security breach. Then, the risk assessment module 130D-3, in conjunction with the processor 130A, may determine if library C is used in the application. The risk assessment module 130D-3, in conjunction with the processor 130A, may also be able to determine and/or signal the severity of any risks that are identified in the application. The risk assessment module 130D-3, in conjunction with the processor 130A, can receive information from the operational risk database server about potential operational risks. The risk assessment module 130D-3, in conjunction with the processor 130A, may also be able to determine and/or signal the severity of any operational risks that are identified in the application.

The error analysis module 130D-4, in conjunction with the processor 130A, can analyze errors from application testing and provide recommendations to fix the errors. The error analysis module 130D-4, in conjunction with the processor 130A, may receive a plurality of error flags from the application testing module 130D-2. The error analysis module 130D-4, in conjunction with the processor 130A, may have classified the error flags based known solutions to the error, and may also be able to classify new errors. Then the error analysis module 130D-4, in conjunction with the processor 130A, may then present recommendations for fixing errors based on the known solutions.

Figure 3:
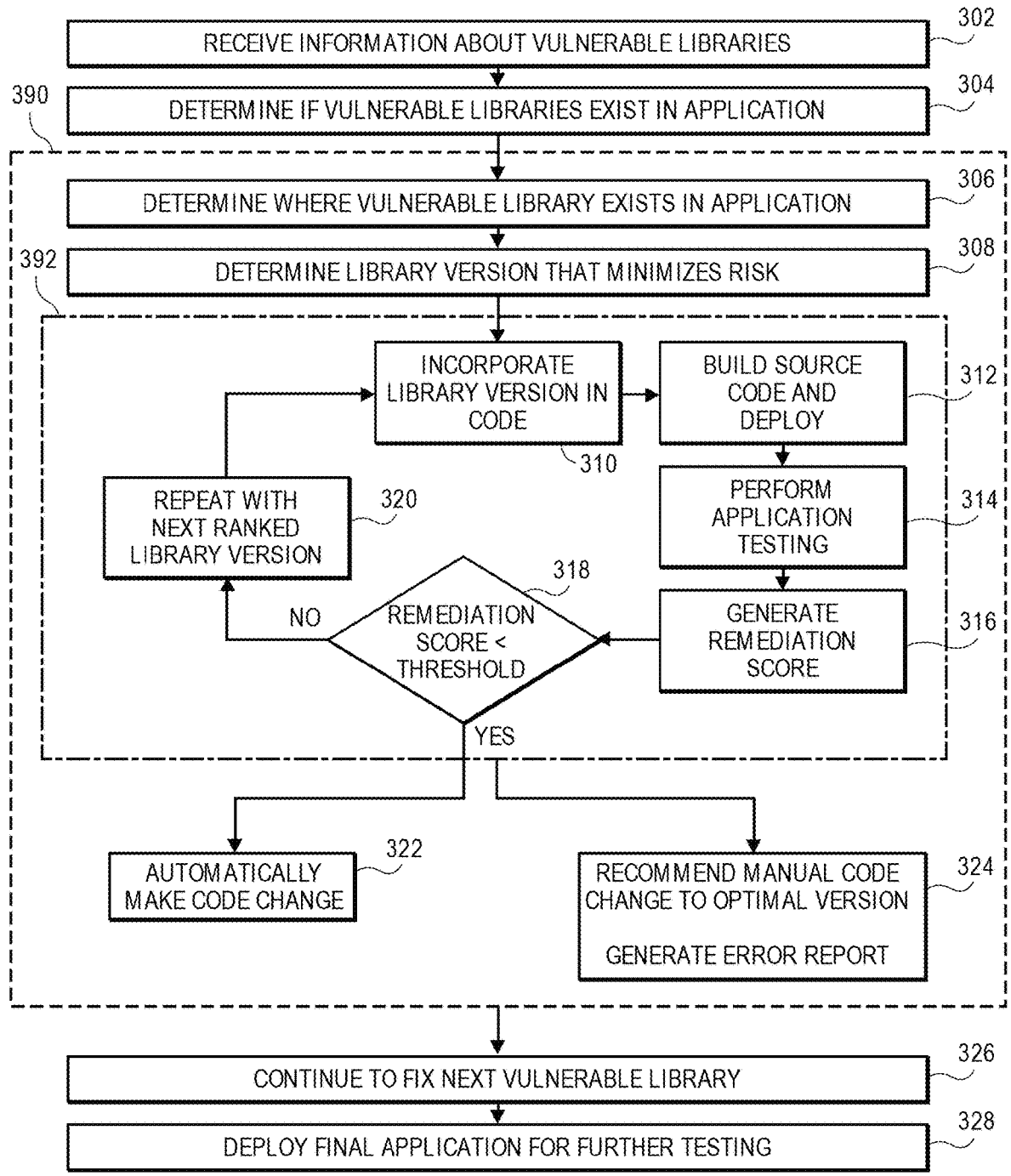
FIG. 3 shows a flow diagram of the remediation method according to embodiments.

FIG. 3 shows a flow diagram depicting vulnerable library identification and remediation method that can be performed by a remediation computer 130. The remediation computer 130 can first receive a candidate application from a client computer. The candidate application may use a plurality of libraries, which may include open source libraries.

In step 302, the remediation computer 130 can receive information about known library vulnerabilities that may be present in the candidate application. The remediation computer 130 may retrieve this information from the license database server 120 and security risk database server 150. The information may be in the form of a list of vulnerable libraries and the risks associated with them.

In step 304, the remediation computer 130 can determine if one or more libraries in the plurality of libraries is vulnerable based upon the information received in step 302. This can be done by examining a list of libraries called when the candidate application is run and comparing the list of called libraries to the list of known vulnerable libraries.

The following steps can be repeated for each of the one or more vulnerable libraries. Loop 390 shows the steps which may be repeated as part of this loop.

In step 306, if one or more vulnerable libraries exist, then the remediation computer, with the localization module, can determine one or more locations of a vulnerable library in the candidate application. The localization module may return, for example, the files or lines of the candidate application in which the name of the vulnerable library appears. The vulnerable library may be called in one or more files of the candidate application. The vulnerable library may also be called by a different library.

In step 308, the remediation computer can determine a library version that minimizes risk. Determining library version risk can comprise evaluating one or more of a plurality of risk factors, including known security risks, licensing risks, and operational risks. The remediation computer can receive information about the versions of the vulnerable library that are available. Scores can be assigned to the various risk factors. In some embodiments, the scores may be industry standard scores such as those in the Common Vulnerability Scoring System (CVSS) 3.0. Additionally, or alternatively, the scores may be custom, nonstandard scores. For example, the library version may have a score of 1 for license risk, because there is only a small licensing risk, and a score of 10 for security risk, because there are several high-level security risks. The library version may also have a score of 1 because it was created by a trusted development community, and a score of 5 because it is not updated frequently. The scores may be aggregated as a composite score, such as a risk score, to describe the relative vulnerability of the library version. For example, the license risk score and security risk score above may be added for a risk score of 11. Scores may also be aggregated as a change score to describe the difficulty of updating the candidate library to include that library version. For example, the library version may have a change score of 6, based on the development community and update frequency risk factors. The list of library versions can then be sorted by the composite score or scores. Determining a library version that minimizes risk is described in more detail with reference to FIG. 5.

The following steps can be then repeated for the one or more library versions. The remediation computer can begin with the best ranked version and proceed with the library versions until it can make an automatic code change or all library versions are tested. Loop 392 shows the steps which may be repeated as part of this loop.

In step 310, the remediation computer can incorporate the determined library version into the candidate application to form a test application. This can be done by changing the library version called in the locations identified in step 306.

In step 312, the remediation computer can build the test application on a certification server. Building the test application on a certification server to may allow it to be tested in a controlled environment. If the test application fails to build, the remediation computer can flag any generated errors and repeat from step 310 with the next ranked library version.

In step 314, the remediation computer can perform one or more application tests on the test application. Application tests may include functionality testing, regression testing, performance testing, and user interface testing.

Functionality testing may include testing that an application performs the desired functionality. The test application can fail a functionality test by not performing a desired function. It may perform the function in a less than ideal way, or it may not perform it at all. The functionality tests may be written to test new functionality that has been added to an application.

Regression testing may include testing that an application performs all previous functionality. Regression testing may involve testing functionality tests from previous versions of the application. Adding new functionality may have affected past functionality. The test application can fail a regression test by not performing a previous function. It may perform the function in a less than ideal way, or it may not perform it at all.

Performance testing may include testing the runtime of the application. The time that the candidate application takes to perform certain functions may have been recorded. The time that the test application takes to perform the same functions can be compared to the time of the candidate application. A test application may fail a performance test by taking longer than the candidate application to perform a function or consuming excessive resources.

User interface testing may include testing the user interface for changes. A change in the user interface may indicate that some elements of the user interface are not loading correctly in some way. This may make it more difficult or impossible for a user to interact with the application. The test application can fail a user interface test if there are any differences between the user interface of the test application and the candidate application.

The remediation computer may generate an intermediate remediation score from each test. For example, one test may have failed in the functionality testing, resulting in an intermediate remediation score of 10, and 3 tests may have failed in the regression testing resulting in an intermediate remediation score of 30. The performance testing and user interface testing may have passed with no errors, resulting in intermediate remediation scores of 0.

In step 316, the remediation computer may use the intermediate remediation scores to determine a remediation score for the application tests. For example, intermediate remediation scores of 10, 30, 0, and 0 as in the example above may result in a remediation score of 40.

In step 318, the remediation score may be compared to a predetermined threshold. A score below the threshold may indicate that the proposed library version can be automatically incorporated into the final application precursor. For example, the threshold may be 20, and thus a library version with a remediation score of 10 can likely be incorporated automatically. A score above the threshold may indicate that manual changes are needed to incorporate the library version. For example, the threshold may be 20, and thus a library version with a remediation score of 40 likely cannot be incorporated automatically.

In step 322, if the remediation score is below the predetermined threshold, the remediation computer may incorporate the determined library version into a final application precursor, then exit loop 390 and proceed to step 326.

In step 320, if the remediation score is above the predetermined threshold, the remediation computer may generate a notification that the determined library version is not acceptable. The remediation computer may then select another library version and repeat steps 310-318 in loop 392.

In step 324, if the remediation computer did not automatically incorporate any library versions after testing each available version, the remediation computer may exit loop 392 and recommend a manual change for the final application precursor. In recommending a manual change to a particular library version, it may also generate an error report summarizing errors in the application testing.

In step 326, the remediation computer may repeat the process from step 306 with the next vulnerable library in the candidate application. This can continue until recommendations or changes have been made for each of the vulnerabilities in the candidate application as determined in step 304. For each iteration, the remediation computer may use the final application precursor from the previous iteration as the candidate application. The remediation computer may alternatively begin with the original candidate application for each iteration.

In step 328, the remediation computer may use the final application precursor and the recommendations to determine a final application. Determining a final application may include automatically incorporated library versions and/or recommended manual changes. The final application can then, for example, be sent to another computer in the network for further testing or deployed as a complete application.

Figure 4:
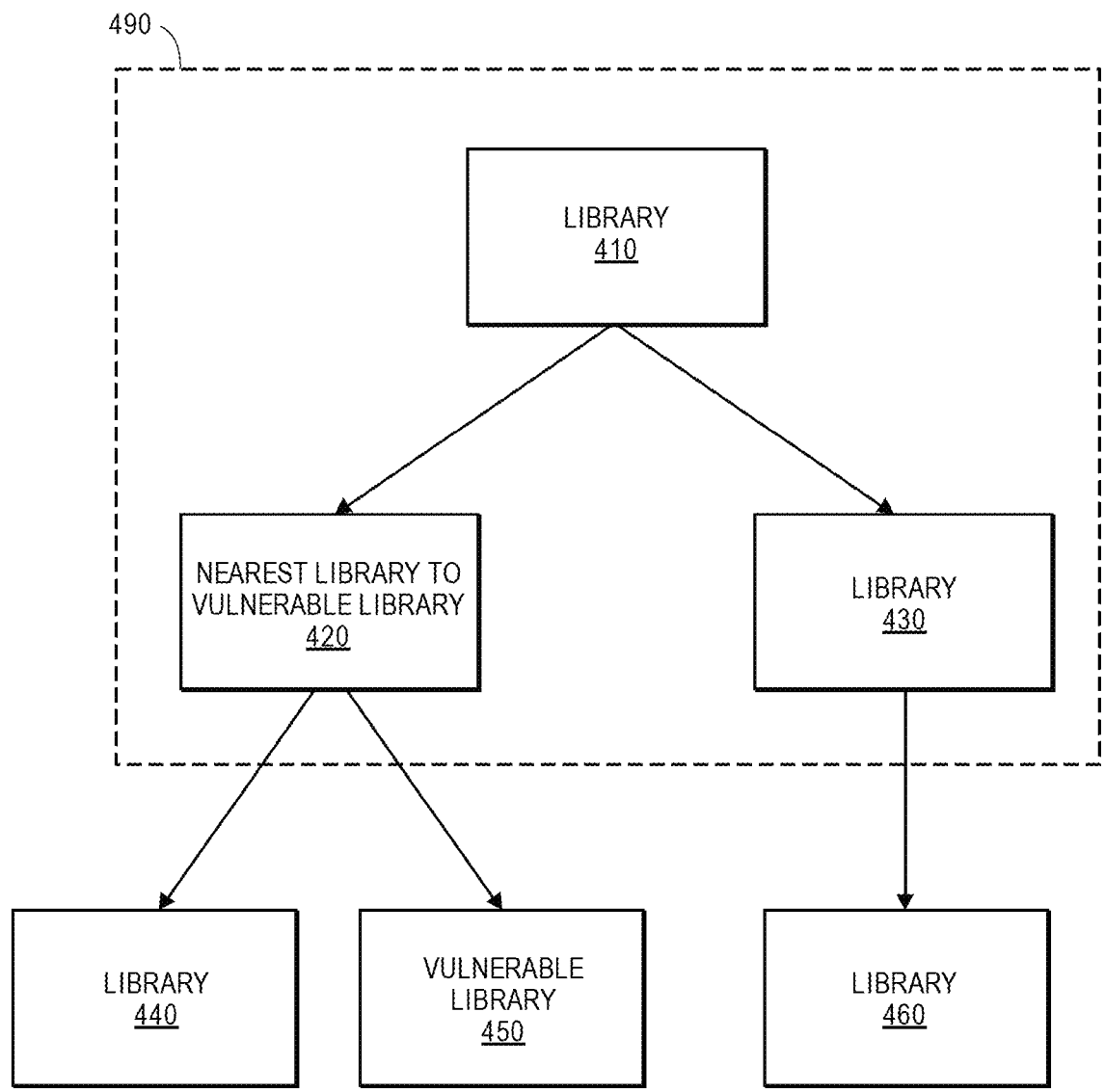
FIG. 4 shows a library dependency tree for identifying the location of vulnerable libraries.

FIG. 4 shows a dependency tree for identifying a nearest vulnerable library.

A library may call additional libraries, creating library dependencies. For example, in FIG. 4, library 410 may depend on libraries 420 and 430. Box 490 can denote the extent of the candidate application. Libraries 410, 420, and 430 may all be called in files that make up the candidate application. Library 420 may depend on libraries 440 and 450. Library 430 may depend on library 460. Libraries 440, 450, and 460 may be called in files not within the candidate application, and thus can be outside of box 490. These libraries can thus be considered external to the candidate library. Library 450 may be a vulnerable library.

To determine the location of the vulnerable library, a dependency tree as in FIG. 4 may be created for the libraries within the candidate application and any libraries external to the candidate application on which libraries in the candidate library depend. In doing so, the remediation computer may identify files in the candidate application where libraries are called. If the vulnerable library 450 is called within the candidate application, the vulnerable library can be the nearest vulnerable library. If the vulnerable library is external to the candidate application, the call to the library may not be able to be edited. Updating the nearest vulnerable library may result in an application that does not call the vulnerable library and thus no longer has that vulnerability. Therefore, the library in the candidate application 420 that calls the vulnerable library 450 can be the nearest vulnerable library. Then, the nearest vulnerably library can be treated as the vulnerable library itself during testing.

Figure 5:
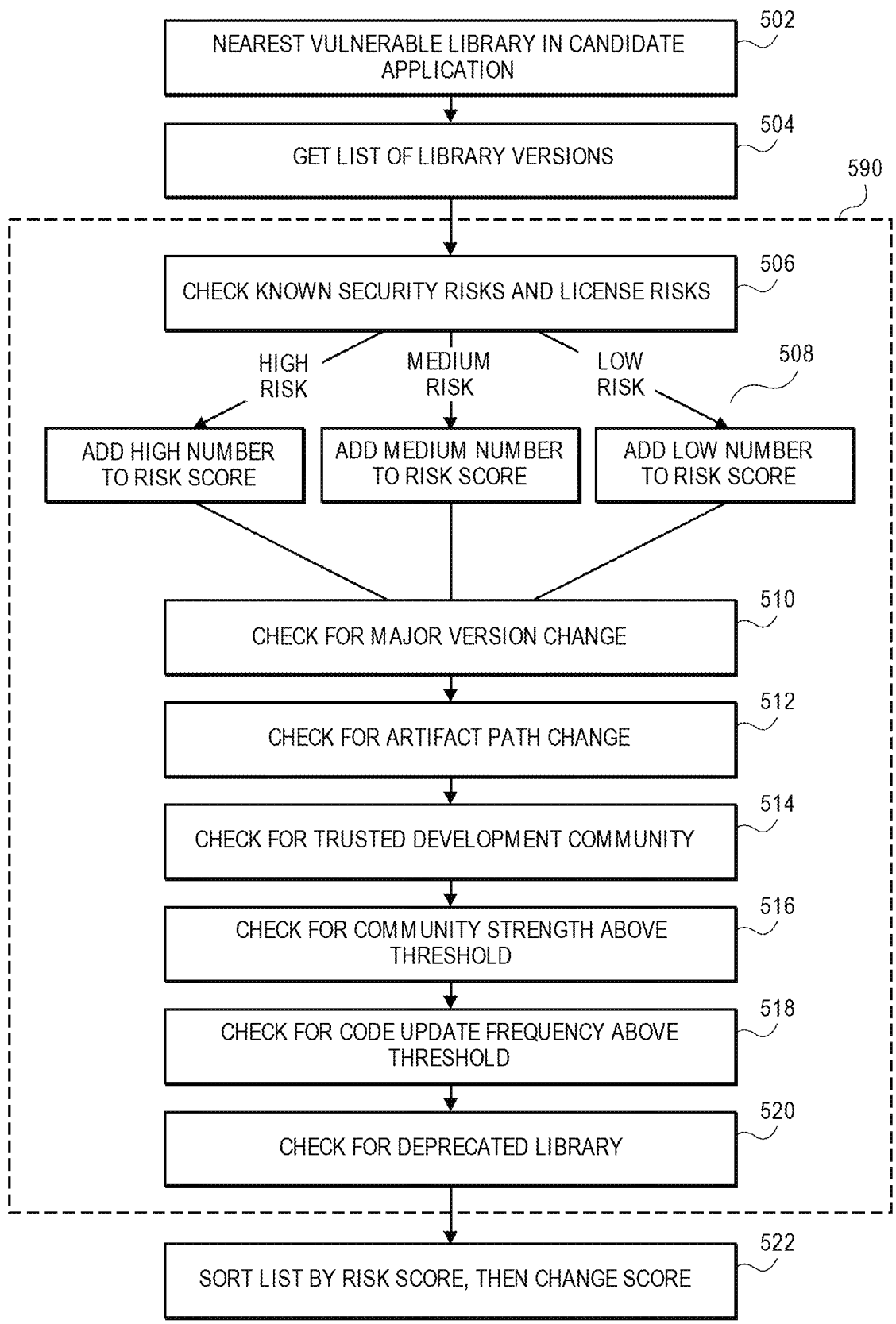
FIG. 5 shows a flow diagram depicting a method of determining a library version that minimizes risk according to embodiments.

FIG. 5 shows the process of determining a library version that minimizes risk. Library version risk can depend on a risk score and a change score. The risk score can quantify the potential risk of a library version. A library version with a high risk score can have many security and/or license risks that may make the candidate application more vulnerable. A library version with a low risk score can have few security and/or license risks that may make the candidate application more secure. The change score can quantify operational risks. A library version with a low change score may have fewer operational risks to negatively affect functionality of the application. A library version with a high change score might have many operational risks and therefore result in more remediation over time.

In step 502, the nearest library to the vulnerable library can be determined. This may be done following the method outlined above in FIG. 4.

In step 504, a list of all versions of the vulnerable library can be retrieved. This may be provided by an external database.

Then, the remediation computer may repeat the following steps for each proposed library version. Loop 590 shows the steps which may be repeated as part of this loop.

In step 506, the security and license risks of the proposed library version can be identified and evaluated. The risk information can come from the license database server and the security risk database server. For each risk identified, the remediation computer may set an error flag.

In step 508, an intermediate risk score can be assigned for each risk identified. For example, if a high risk is determined, a high number can be added to the risk score. If a medium risk is determined, a medium number can be added to the risk score. If a low risk is determined, a low number can be added to the risk score. For example, a high risk might add 10 to the risk score, a medium risk might add 5 to the risk score, and a low risk might add 1 to the risk score. Risk levels may be provided by the license database server and the security risk database server. If risk levels are provided, the remediation computer may use additional criteria to determine additional scores. For example, the remediation computer might determine that some high-level risks only merit adding 7 to the risk score, and some medium level risks only merit adding 3 to the risk score. In some embodiments, the scores may be industry standard scores such as CVSS 3.0. Additionally, or alternatively, the scores may be custom, nonstandard scores.

A final risk score can then be determined for the proposed library version based on the intermediate risk scores. For example, a proposed library version might have a license risk with a score of 5, and two security risks with scores of 7 and 1. The final risk score might then be the sum of intermediate risk scores, resulting in a final risk score of 13 for the proposed library version.

In steps 510-520 different operational risks can be evaluated, to thereby generate a change score. An operational risk can be a risk that an aspect of a library used by an application might adversely affect operation of the application. In some embodiments, operational risks may be risks that are associated with external sources, such as the development community that created the library, which may affect functionality of the library and applications which use the library. Examples are provided of some operational risks that may be evaluated, but it is appreciated that some risks may not be evaluated or additional ones may be. The operational risk information may come from the operational risk database server. For each operational risk, a number can be added to a change score for the proposed library version and an error flag can be set.

In step 510, the version number of the proposed library version and the vulnerable library version can be compared. For example, the vulnerable library version may be version 3.4. If the library versions differ by major library version, it may indicate that incorporating the proposed library version into the candidate application will require significant changes. For example, a proposed library version of 4.0 differs in major library version and may be more difficult to incorporate. In this case, a number can be added to the change score. If the library versions only differ in minor library version, it may indicate that they proposed library version can be incorporated with small or no changes. For example, a proposed library version of 3.6 differs in minor library version and may be easier to incorporate. In this case, a smaller number or zero can be added to the change score.

In step 512, the artifact paths of the proposed library version and the vulnerable library version can be compared. An artifact may be a piece of data, such as the output of a process, that persists after an application is built or run. An artifact path may be a directory listing to instruct the computer building or running the application where to store an artifact. Changes in the artifact path may indicate that the team developing the library has changed and/or significant changes have been made to the library. Therefore the library version may be more difficult to incorporate into the candidate application. In this case, a number can be added to the change score. If the artifact paths are the same, a smaller number or zero can be added to the change score.

In step 514, the development community can be checked against a list of trusted development communities. A development community may be an individual, group of individuals, or organization that creates and tests a library. A trusted development community may indicate that the library version is less likely to be risky. If the development community is not trusted, a number can be added to the change score. If the development community is trusted, a smaller number or zero can be added to the change score.

In step 516, the strength of the development community can be evaluated. Development community strength may be the number of developers contributing to the library version. A stronger community may indicate that more people are reviewing the library for potential risks. If the development community strength is below a threshold, a number can be added to the change score. If the development community strength is above the threshold, a smaller number or zero can be added to the change score.

In step 518, the code update frequency of the proposed library version can be evaluated. A library that is updated more frequently may be more likely to have vulnerabilities identified and fixed before they can be compromised. If the code update frequency is below a threshold, a number can be added to the change score. If the code update frequency is above the threshold, a smaller number or zero can be added to the change score.

In step 520, the proposed library version can be checked for deprecation. A deprecated library may be one that is no longer being updated or reviewed. Therefore, any vulnerabilities that are identified after a library is deprecated may not be fixed. If the library is deprecated, a number may be added to the change score. If the library is not deprecated, a smaller number or zero may be added to the change score.

In step 522, after evaluating each library version, the list of library versions can be sorted by the generated scores. For example, the list may be sorted by risk score to determine the library version or versions with the lowest risk. The list can also be sorted by change score to determine the library version or versions that present the lowest operational risk. In some embodiments, the list of library versions can be sorted by risk score and then by change score. The library version that minimizes risk may then be determined from this list. For example, the library that minimizes risk may be the library version with lowest risk score and/or lowest change score.

Before incorporating the library version that minimizes risk into the candidate application, an exclusion test may be performed to identify if the vulnerable library is a necessary component of the candidate application. To perform an exclusion test, the vulnerable library may be removed from the candidate application to create a test application, and the test application may be built on a certification server. Application tests may then be performed on the test application. If the application tests exceed a certain threshold, it may be that the vulnerable library is not necessary in the candidate application. Application tests are described in more detail below. If the exclusion test determines that the vulnerable library is not necessary, then the remediation computer may recommend that the vulnerable library is removed for the final application precursor.

The exclusion test may also identify if the vulnerability is used in the application. In the localization step, the functions from the library used in the application may be determined. For example, the application may only use half of the functions in the vulnerable library. It may be that one or more vulnerability exists in functions that are not used in the application. It may also be that all of the vulnerabilities occur in the functions that are not used in the application. If the application does not use the functionality that contains the vulnerability, the vulnerable library may have lower risk. If the exclusion test determines that the vulnerability is not used in the application, then the remediation computer may recommend that the portion or portions of the vulnerable library that contain the vulnerability be removed for the final application precursor.

If the exclusion test determines that the vulnerable library is needed in the candidate application, the library version that minimizes risk can be incorporated into the candidate application to create a test application. The test application can then be built on a certification server for testing. Building the test application may be a part of build testing. If building the test application fails, errors may be generated by the remediation computer. The remediation computer may then generate error flags for the errors. If the test application cannot be built, the test application may not be able to be tested. The remediation computer may then move on to the next library version that minimizes risk.

Figure 6:
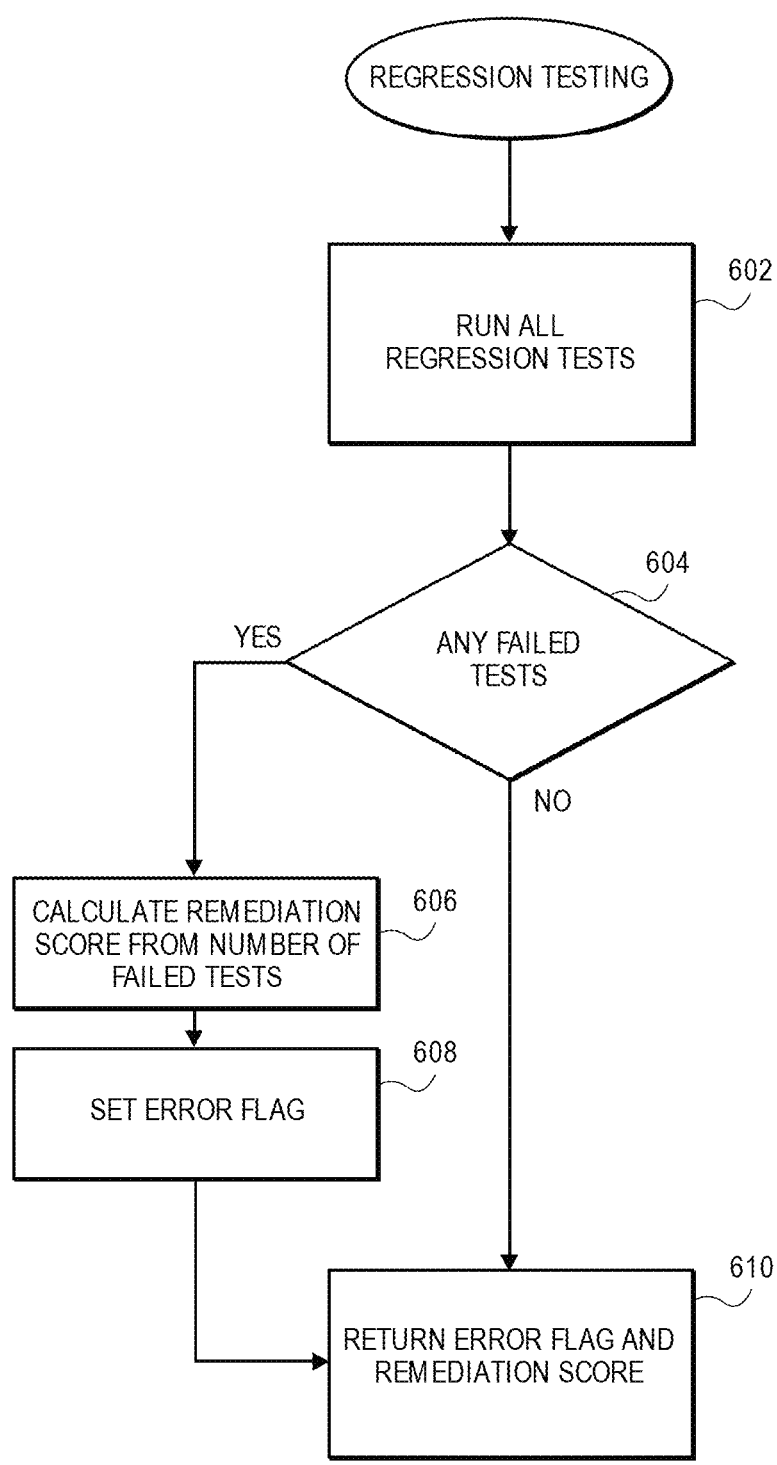
FIG. 6 shows a flow chart depicting regression testing according to embodiments.

Once the test application has been built, application tests may be performed on the test application. Application tests may include functional testing, regression testing, performance testing, and user interface testing. FIG. 6 shows regression testing, which may be exemplary of the application tests (not including a user interface test, depicted in FIG. 7).

In step 602, regression tests can be run on the test application. Regression tests can be tests that verify that a new version of an application maintains the functionality of previous versions.

Step 602 may also be done with other application tests. Functional testing can be tests to verify that an application has the desired functionality. Performance testing can be tests to determine the time an application takes to complete certain tasks or functionalities.

In step 604, the remediation computer can check for any failed tests. If there are not any failed tests, the remediation computer can proceed to step 610.

In step 606, if there are failed tests, the remediation computer can calculate a remediation score. A failed regression or functionality test may occur when a functionality is no longer successfully performed. A failed performance test may occur when a function takes longer to complete than before or than some threshold. A failed performance test may also occur when the candidate application consumes excessive resources while running. The remediation score may be based on the number of failed tests. The remediation score may also be based on the type of failed tests. For example, a major failure may result in a larger remediation score than a minor failure. The remediation score may be calculated differently for each kind of application test.

In step 608, the remediation computer may set an error flag to note the types of errors generated by the failed tests.

In step 610, the remediation computer can return the error flags and the remediation score. If no tests were failed, the remediation computer may return that there are no error flags. The remediation score returned for a particular test may be an intermediate remediation score that can be combined with intermediate remediation scores from other application tests to determine a remediation score. The remediation score may then be used to determine if the proposed library version can be automatically incorporated into the candidate application, as in step 318 of FIG. 3.

Figure 7:
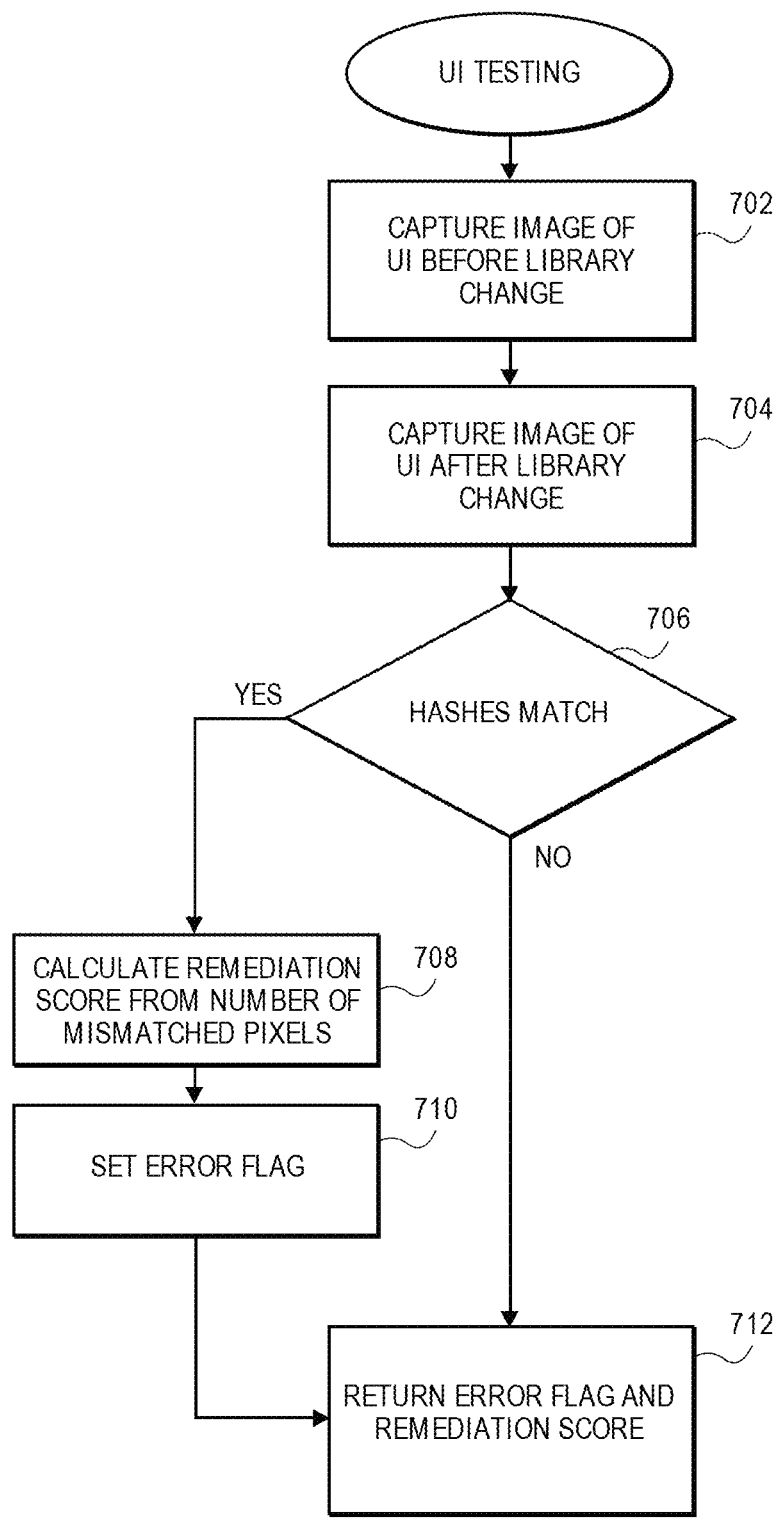
FIG. 7 shows a flow chart depicting user interface testing according to embodiments.

FIG. 7 shows user interface testing. A user interface test can test how the user interface of an application changes as an application is updated.

In step 702, an image of the user interface may be captured before the vulnerable library is changed. This may be captured from the candidate application before the remediation process.

In step 704, an image of the user interface can be captured from the test application after the library version has been changed.

In step 706, the images of the user interface can be hashed. The hashes can then be compared. In hashing the images, they can be compressed, making the comparison easier or faster than comparing the images directly. If the hashes do match, the remediation computer can proceed to step 712.

In step 708, if the hashes do not match, the remediation computer can compare the images of the user interface directly. A remediation score can then be calculated. For example, the remediation score may be the number of pixels that do not match between the images.

In step 710, the remediation computer can set an error flag to note that there was change in the user interface.

In step 712, the remediation computer can return the error flag and the remediation score. If the user interfaces matched, the remediation computer may return that there are no error flags. The remediation score returned may be an intermediate remediation score that can be combined with intermediate remediation scores from other tests to determine a remediation score.

Once all of the intermediate remediation scores have been calculated, they can be combined to create a remediation score. The remediation score is then compared to a threshold. If the remediation score for the library version is above the threshold, it may indicate that the library versions all require significant changes that cannot be made automatically by the remediation computer. Then the process repeats with the next ranked library version. The exclusion test does not need to be repeated for subsequent library versions.

If the remediation score is below the threshold, the remediation computer may automatically make the code change to the new library version. The remediation computer may test each library version until it is able to automatically update the vulnerable library.

If after all versions of the vulnerable library have been tested none have been automatically incorporated, the remediation computer may recommend a manual code change. The remediation computer may recommend a change to the library version with the lowest risk score, change score, and/or remediation score. Recommending a manual code change may involve presenting a message to a developer with the library version being recommended and an error report.

In generating an error report, the remediation computer may analyze the error flags that were generated during the tests. Error flags may come, for example, from application testing, build testing, and library risk determination. Each error may have associated information such as the type of error, the test where the error originated, and details about the library version where the error originated. The errors may be sorted into various classes. For example, the classes may be grouped by the estimated hours to fix the error, recommendations on how to fix the error, any platform change that may be recommended, and/or any code change that may be recommended. The information for this classification may come from data collected by the remediation computer about past errors that have been fixed.

The remediation computer may also classify new errors. The remediation computer may use a machine learning algorithm to classify new errors, such as a k-nearest neighbors (K-NN) algorithm. In a K-NN algorithm, the remediation computer can calculate the Euclidean distance between a new error to be classified and each of the known errors. The points for the Euclidean distance measure may be the information about the error as described above. The errors with smallest distance are likely those most similar to the new error. The new error can then be added to the class of the errors that are closest to the new error.

After automatically incorporating the proposed library version into a final application precursor, or recommending a manual change, the remediation computer can move on to the next identified vulnerable library. Once changes or recommendations for are made for all the vulnerabilities identified, the remediation computer can generate a final application. The final application can then be sent to another computer in the network for additional testing or final deployment if no manual changes are recommended, or after manual changes have been made.

In some embodiments, a final verification phase may occur. The final verification phase may be conducted by running two instances (e.g., Docker images) of the application in parallel in production. One instance may contain the final application containing library security vulnerability fix and the other instance may contain the original candidate application without the library vulnerability fix. Inputs to the application may be passed to both instances and the results from each instance may be compared. If the results from each instance are found to be the same, this may indicate that the vulnerability fixes did not have any functional changes. The instances may run in parallel until confidence is gained to remove the vulnerable instance (e.g., for 24 hours).

Embodiments of the invention have a number of advantages. One advantage is decreasing the time it takes developers to remediate an applications after a vulnerability is detected. Currently development processes, from identifying a risk in an application to making the change, can take up to 90 days. This may slow down the development process if the vulnerability is discovered before an application is deployed. If the vulnerability is discovered after the application is deployed, it may mean that the application is vulnerable to known attacks until it can be remediated. Embodiments of the invention can speed up the remediation process to take hours. Once a new vulnerability is identified, the remediation computer may take less than 2 hours to determine if an application is vulnerable, select a new library version, and build a test application. Testing the test application and creating the final application may take an additional 9 hours, resulting in a total time to remediation of less than 12 hours. This is drastically less compared to 60-90 days in the current process. Even if the remediation computer is not able to automatically remove the vulnerability, it can provide recommendations and focus the effort of developers. The remediation computer can point out specific issues the developer might face and the specific code that will cause issues/errors when library version is changed and provide recommendations of how similar issues/errors were fixed.

Embodiments of the invention help solve the problem of checking an application for vulnerabilities each time a new library vulnerability is discovered. By using a remediation computer, it can check repeatedly, every time a new library vulnerability is discovered and/or each time the application is edited. For example, the remediation computer can be made a part of the application development pipeline. This can drastically increase the security of applications. Increased security may be especially critical with applications that include payment information, such as credit card numbers, or personal information, like social security numbers. Quicker fixes can drastically reduce the opportunity for an attacker to exploit the vulnerability.

Embodiments of the invention can provide improved ways of analyzing the errors that result from application testing and remediation. Using a machine learning algorithm to classify errors may allow for additional data analysis of the errors. For example, the remediation computer may determine which kind of error appears most often. This may then inform development practices and lead to applications that the remediation computer can more easily fix automatically. Pointing out issues/errors the developer will face and providing recommendations before a manual change provides the developer with domain knowledge and may save the developer time when fixing the issue.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a remediation computer, a candidate application that uses a plurality of code libraries;
   identifying, by the remediation computer, a vulnerable library from the plurality of code libraries;
   obtaining, by the remediation computer, a list of a plurality of versions of the vulnerable library;
   for each of the plurality of versions of the vulnerable library in the list:
      identifying one or more risks, wherein each of the identified one or more risks is assigned a risk score;
      assigning an intermediate risk score to each of the identified one or more risks based on the risk score for each of the identified one or more risks;
      evaluating one or more operational risks to generate a change score;
   sorting, by the remediation computer, the plurality of versions of the vulnerable library in the list based on the generated change score;
   determining a version of the vulnerable library that minimizes risk from the sorted list; and
   incorporating the determined version of the vulnerable library that minimizes the risk into the candidate application.

2. The method according to claim 1, wherein the identifying the one or more risks comprises:
   obtaining security risk information from a security risk database server;
   obtaining license risk information from a license database server;
   identifying at least one risk from the security risk information;
   identifying at least one risk from the license risk information; and
   setting an error flag for each risk identified from the security risk information and the license risk information.

3. The method according to claim 1, wherein the vulnerable library is a library that is within the candidate application.

4. The method according to claim 1, wherein the vulnerable library is a library within the candidate application that calls an external vulnerable library.

5. The method according to claim 1, wherein the list of the plurality of versions of the vulnerable library are obtained from an external database.

6. The method according to claim 1, wherein the assigning the intermediate risk score to each of the identified one or more risks based on the risk score for each of the identified one or more risks comprises:
   in response to determining a risk of the identified one or more risks is high, adding a high number to the risk score;
   in response to determining that the risk of the identified one or more risks is medium, adding a medium number to the risk score; and
   in response to determining that the risk of the identified one or more risks is low, adding a low number to the risk score.

7. The method according to claim 1, wherein an operational risk is a risk that affects an operation of the candidate application.

8. The method according to claim 1, wherein the evaluating the one or more operational risks to generate the change score comprises:
   comparing a major version number of the vulnerable library with a major version number of a proposed library version of the plurality of versions of the vulnerable library in the list;
   determining whether the major version number of the vulnerable library is greater than the major version number of the proposed library version of the plurality of versions of the vulnerable library in the list by a first predetermined threshold; and
   in response to determining that the major version number of the vulnerable library is greater than the major version number of the proposed library version of the plurality of versions of the vulnerable library by the first predetermined threshold, increasing the change score by a first value.

9. The method according to claim 8, wherein the evaluating the one or more operational risks to generate the change score further comprises:
   comparing a minor version number of the vulnerable library with a minor version number of the proposed library version of the plurality of versions of the vulnerable library in the list;
   determining whether the minor version number of the vulnerable library is greater than the minor version number of the proposed library version of the plurality of versions of the vulnerable library in the list by a second predetermined threshold; and
   in response to determining that the minor version number of the vulnerable library is greater than the minor version number of the proposed library version of the plurality of versions of the vulnerable library by the second predetermined threshold, increasing the change score by a second value that is lower than the first value.

10. The method according to claim 1, wherein the evaluating the one or more operational risks to generate the change score comprises:
    comparing an artifact path of the vulnerable library with an artifact path of a proposed library version of the plurality of versions of the vulnerable library in the list;
    determining whether the artifact path of the vulnerable library is greater than the artifact path of the proposed library version of the plurality of versions of the vulnerable library in the list by a first predetermined value; and
    in response to determining that the artifact path of the vulnerable library is greater than the artifact path of the proposed library version of the plurality of versions of the vulnerable library in the list by the first predetermined value, increasing the change score by a first value.

11. The method according to claim 10, wherein the evaluating the one or more operational risks to generate the change score further comprises:

in response to determining that the artifact path of the vulnerable library is not greater than the artifact path of the version of the plurality of versions of the vulnerable library in the list by the first predetermined value, increasing the change score by a second value that is less than the first value.

12. The method according to claim 10, wherein an artifact is data that persists after the candidate application is built or run.

13. The method according to claim 12, wherein the artifact path is a directory listing instructing a computer building or running the candidate application where to store the artifact.

14. A remediation computer comprising:

a processor; and a computer readable medium comprising code, executable by the processor, for implementing a method comprising:

receiving, by the remediation computer, a candidate application that uses a plurality of code libraries;

identifying, by the remediation computer, a vulnerable library from the plurality of code libraries;

obtaining, by the remediation computer, a list of a plurality of versions of the vulnerable library;

for each of the plurality of versions of the vulnerable library in the list:

identifying one or more risks, wherein each of the identified one or more risks is assigned a risk score;

assigning an intermediate risk score to each of the identified one or more risks based on the risk score for each of the identified one or more risks;

evaluating one or more operational risks to generate a change score;

sorting, by the remediation computer, the plurality of versions of the vulnerable library in the list based on the generated change score;

determining a version of the vulnerable library that minimizes risk from the sorted list; and incorporating the determined version of the vulnerable library that minimizes the risk into the candidate application.

15. The remediation computer according to claim 14, wherein the identifying the one or more risks comprises:

obtaining security risk information from a security risk database server;

obtaining license risk information from a license database server;

identifying at least one risk from the security risk information;

identifying at least one risk from the license risk information; and setting an error flag for each risk identified from the security risk information and the license risk information.

16. The remediation computer according to claim 14, wherein the vulnerable library is a library that is within the candidate application.

17. The remediation computer according to claim 14, wherein the vulnerable library is a library within the candidate application that calls an external vulnerable library.

18. The remediation computer according to claim 14, wherein the list of the plurality of versions of the vulnerable library are obtained from an external database.

19. The remediation computer according to claim 14, wherein the assigning the intermediate risk score to each of the identified one or more risks based on the risk score for each of the identified one or more risks comprises:

in response to determining a risk of the identified one or more risks is high, adding a high number to the risk score;

in response to determining that the risk of the identified one or more risks is medium, adding a medium number to the risk score; and in response to determining that the risk of the identified one or more risks is low, adding a low number to the risk score.

20. The remediation computer according to claim 14, wherein an operational risk is a risk that affects an operation of the candidate application.

* * * * *